(12) United States Patent
Kamakura et al.

(10) Patent No.: US 12,170,022 B2
(45) Date of Patent: Dec. 17, 2024

(54) DRIVING ASSISTANCE APPARATUS

(71) Applicant: Honda Motor Co., Ltd., Tokyo (JP)

(72) Inventors: Hiroshi Kamakura, Wako (JP); Yasuhiko Awamura, Wako (JP)

(73) Assignee: Honda Motor Co., Ltd., Tokyo (JP)

( * ) Notice: Subject to any disclaimer, the term of this patent is extended or adjusted under 35 U.S.C. 154(b) by 257 days.

(21) Appl. No.: 17/982,499

(22) Filed: Nov. 7, 2022

(65) Prior Publication Data

US 2023/0154334 A1 May 18, 2023

(30) Foreign Application Priority Data

Nov. 15, 2021 (JP) ................. 2021-185413

(51) Int. Cl.
| G08G 1/16 | (2006.01) |
| B60Q 9/00 | (2006.01) |
| G08G 1/056 | (2006.01) |
| G01S 13/931 | (2020.01) |

(52) U.S. Cl.
CPC ............... *G08G 1/166* (2013.01); *B60Q 9/00* (2013.01); *G08G 1/056* (2013.01); *G01S 2013/93272* (2020.01)

(58) Field of Classification Search
CPC .......... B60Q 9/00; B60Q 9/008; G08G 1/056; G08G 1/167; G01S 2013/93272; G01S 13/931; G01S 2013/9315; G01S 13/867; B60W 50/14; B60W 30/18159; B60W 2050/143

See application file for complete search history.

(56) References Cited

U.S. PATENT DOCUMENTS

2013/0062474 A1* 3/2013 Baldwin ............... B61L 29/282
　　　　　　　　　　　　　　　　　　　　　246/122 R
2019/0265709 A1* 8/2019 Saikyo ................. B60W 30/16
2020/0255033 A1* 8/2020 Matsunaga ..... B60W 30/18145

FOREIGN PATENT DOCUMENTS

JP　　2008293269 A　*　12/2008

OTHER PUBLICATIONS

Machine Translation of Japanese JP 2008293269 A.*

* cited by examiner

*Primary Examiner* — Sisay Yacob
(74) *Attorney, Agent, or Firm* — Duft & Bornsen, PC

(57) ABSTRACT

A driving assistance apparatus including an approach detection part detecting an approach of a railway vehicle along a travel path from a diagonally backward of a subject vehicle to the subject vehicle without using a road-to-vehicle communication, a notification part notifying a driver of information and a microprocessor. The microprocessor is configured to perform estimating a traveling direction of the subject vehicle at an intersection, and controlling the notification part so as to notify the driver of the approach of the railway vehicle when the traveling direction crossing the travel path is estimated and the approach of the railway vehicle to the subject vehicle is detected by the approach detection part.

17 Claims, 5 Drawing Sheets

DRIVING ASSISTANCE APPARATUS

CROSS-REFERENCE TO RELATED APPLICATION

This application is based upon and claims the benefit of priority from Japanese Patent Application No. 2021-185413 filed on Nov. 15, 2021, the content of which is incorporated herein by reference.

BACKGROUND OF THE INVENTION

Field of the Invention

This invention relates to a driving assistance apparatus that assists a driving operation of a driver.

Description of the Related Art

Conventionally, as an apparatus of this type, there is a known apparatus that that notifies a driver of a vehicle of an approach of a railway vehicle is known. Such a device is described, for example, in in Japanese Unexamined Patent Publication No. 2008-293269 (JP2008-293269A). In the apparatus described in JP2008-293269A, when a vehicle turns right across a track of a railway vehicle, the approach of the railway vehicle is detected by the road-to-vehicle communication, and the approach of the railway vehicle is notified to the driver.

However, the apparatus described in JP2008-293269A require a communication beacon to be installed on a road or on a track of a railway vehicle, resulting in an increase in cost. Therefore, it is desired to provide an apparatus that suppresses a decrease in the smoothness of traffic while suppressing an increase in cost and improving the safety of the traffic without hindering the traffic flow in the vicinity.

SUMMARY OF THE INVENTION

An aspect of the present invention is a driving assistance apparatus, configured to assist a driving by a driver of a subject vehicle, the subject vehicle locating on a side of a travel path on which a railway vehicle travels. The driving assistance apparatus includes an approach detection part detecting an approach of the railway vehicle along the travel path from a diagonally backward of the subject vehicle to the subject vehicle without using a road-to-vehicle communication, a notification part notifying the driver of information, and an electronic control unit including a microprocessor and a memory connected to the microprocessor. The microprocessor is configured to perform estimating a traveling direction of the subject vehicle at an intersection, and controlling the notification part so as to notify the driver of the approach of the railway vehicle when the traveling direction crossing the travel path is estimated and the approach of the railway vehicle to the subject vehicle is detected by the approach detection part.

BRIEF DESCRIPTION OF THE DRAWINGS

The objects, features, and advantages of the present invention will become clearer from the following description of embodiments in relation to the attached drawings, in which.

DETAILED DESCRIPTION OF THE INVENTION

Hereinafter, an embodiment of the present invention is explained with reference to FIGS. 1 to 6. The driving assistance apparatus according to an embodiment of the present invention is configured to assist driving of a driver of a vehicle on a road on which a railway vehicle travels along a railroad track laid on a road, i.e., on the road which a tram travels. In such a road on which the tram travels, a driving assistance suitable for the situation is required.

Figure 1:
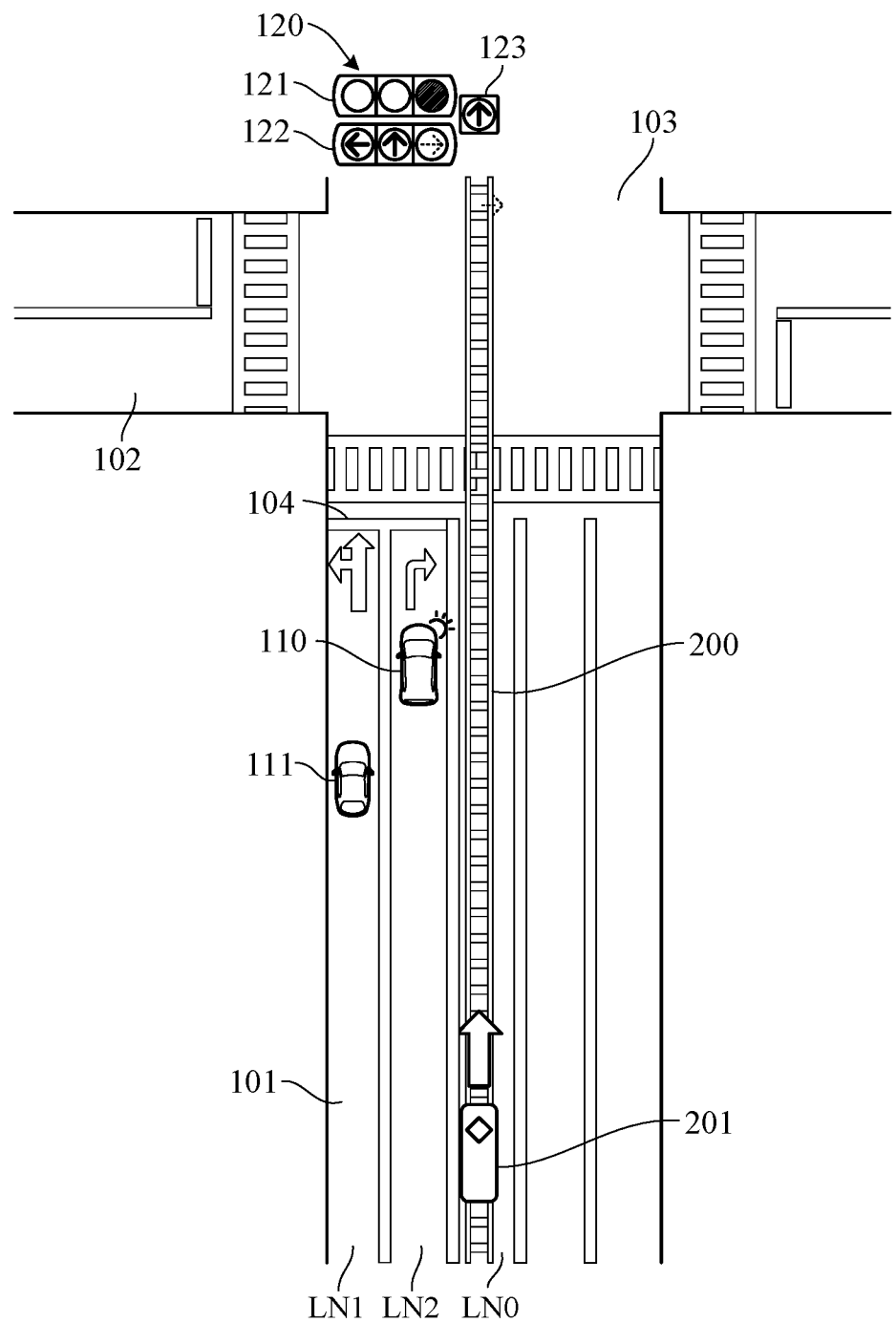
FIG. 1 is a diagram showing an example of a travel scene to which a driving assistance apparatus according to an embodiment of the present invention is applied.

FIG. 1 is diagrams showing an example of travel scene to which the driving assistance apparatus according to the embodiment of the present invention is applied. FIG. 1 shows an intersection 103 where a road 101 and a road 102 intersect. A railroad track 200 is laid at a central portion LN0 in a width direction (referred to as a central lane for convenience) of the road 101. A tram 201 travels along the railroad track 200. The road 101 includes a first lane LN1 and a second lane LN2 adjoining each other. The first lane LN1 is a lane for straight travel and left turn of the intersection 103, and the second lane LN2 is a lane for right turn. The second lane LN2 extends adjacently to the central lane LN0.

The subject vehicle 110 is located in the second lane LN2. In the first lane LN1, another vehicle 111 is located behind the subject vehicle 110. The configurations of the roads 101 and 102 are not limited to those described above. For example, the road 101 may be one lane or three lanes or more, rather than two lanes on one side. The second lane LN2 may be a right-turn enabled lane instead of a right-turn dedicated lane.

At the intersection 103, a traffic light 120 is installed. A plurality of traffic lights 120 are installed at the intersection 103 in association with vehicles entering the intersection 103 from the respective directions, but for convenience, a single traffic light 120 is illustrated in FIG. 1. The traffic light 120 includes a main traffic light 121 configured to be capable of switching between a red light indicating a stop command, a green light indicating that traveling is possible, and a yellow light indicating that traveling is possible but safe stop is difficult, and an auxiliary traffic light 122 attached to the main traffic light 121.

The auxiliary traffic light 122 is an arrow traffic light indicating a direction in which a vehicle can travel by using an arrow. More specifically, the auxiliary traffic light 122 includes arrows indicating a straight direction, a left-turn direction, and a right-turn direction and makes notification of a direction in which the vehicle can travel by turning on the arrows. In FIG. 1, a main traffic light 121 is red, the arrows indicating the straight direction and the left-turn direction are turned on, and the arrow indicating the right-turn direction is turned off. Therefore, the subject vehicle 110 located in the second lane LN2 stops at a stop line 104 before the intersection 103 while causing a turn signal lamp to blink. The other vehicle 111 located in the first lane LN1 passes by the subject vehicle 110 and passes through the intersection 103 or turns left.

The traffic light 120 includes not only the traffic lights 121 and 122 for vehicles but also a traffic light 123 for trams. The traffic light 123 is an arrow traffic light indicating a direction in which the tram 201 can travel by using an arrow. The auxiliary traffic light 122 for vehicles is turned on with green arrows, whereas the traffic light 123 is turned on with, for example, a yellow arrow. In FIG. 1, the arrow of the traffic light 123 is turned on, and the tram 201 can travel without stopping at the intersection 103.

In such a traveling scene, a driver of the subject vehicle 110 may feel unexpected when the tram 201 approaches from the diagonally back side of the subject vehicle 110 stopped in the second lane LN2 and passes by the subject vehicle 110. In particular, when a driver is unfamiliar with driving on a road on which the tram 201 travels, the driver does not expect that the tram 201 passes by the subject vehicle 110, in particular, passes on the right side thereof, and thus is greatly surprised. In such a situation, for example, in order to notify the driver of the approach of the tram 201 by road-to-vehicle communication, it is necessary to install communication facilities such as an optical beacon and a radio beacon on the road. This leads to an increase in cost. In view of this, the present embodiment provides a driving assistance apparatus as described below in order to favorably notify the driver of the approach of the tram 201 while suppressing the increase in cost.

Figure 2:
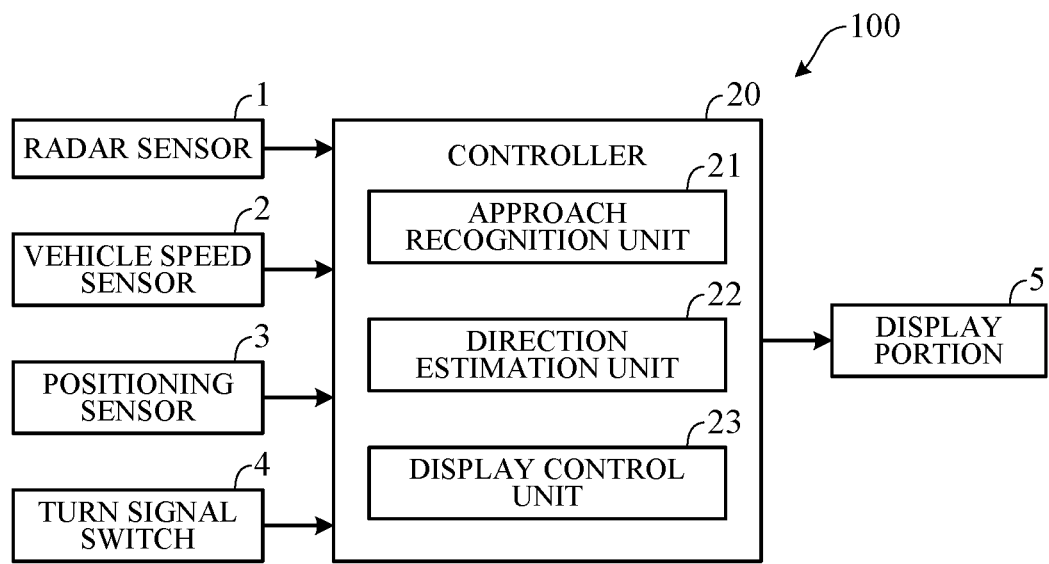
FIG. 2 is a block-diagram illustrating a configuration of a main part of the driving assistance apparatus according to the embodiment of the present invention.

FIG. 2 is a block-diagram schematically illustrating a configuration of a main part of the driving assistance apparatus 100 according to the embodiment of the present invention. As shown in FIG. 2, the driving assistance apparatus 100 includes a controller 20, and a radar sensor 1, a vehicle speed sensor 2, a positioning sensor 3, a turn signal switch 4 and a display portion 5 which are communicably connected to the controller 20, respectively.

The radar sensor 1 is attached to the left and right rear end portions (for example, in the rear bumper) of the subject vehicle, and detects the position of the object around the subject vehicle (in particular, obliquely behind) by the reflected wave from the object. Specifically, the radar sensor 1 includes a radar that detects the presence or absence of an object on the left and right rear sides of the subject vehicle and the distance to the object by emitting electromagnetic waves and detecting reflected waves, and a LIDAR that detects the position of the object on the left and right rear sides of the subject vehicle and the distance to the object by emitting laser light, which is a kind of electromagnetic waves, and detecting reflected light.

The vehicle speed sensor 2 detects the vehicle speed of the subject vehicle. The positioning sensor 3 receives positioning signals transmitted from positioning satellites such as GPS satellites and quasi-zenith satellites. The current position of the subject vehicle can be calculated using the position information received by the positioning sensor 3. The turn signal switch 4 detects an operation of a direction indicator by the driver. The direction indicator is a device for indicating the direction to the surroundings at the time of the right-left turn or the course change of the subject vehicle, and is constituted by a turn signal lever or the like.

A display portion 5 includes indicator lamps provided on left and right side-view mirrors. More specifically, the display portion 5 is provided around or on a mirror surface of each of the left and right side-view mirrors. When an object on the back right side of the subject vehicle is detected, the display portion 5 of the right side-view mirror is turned on or blinks, whereas, when an object on the back left side is detected, the display portion 5 of the left side-view mirror is turned on or blinks. Therefore, in a case where the driver cannot recognize existence of another vehicle via the side-view mirrors due to poor visibility or the like, the driver can recognize the existence of the other vehicle via the display portions 5 and thus can safely change lanes, for example. The display portions 5 may be provided at any positions as long as the driver can visually recognize the display portions 5 at the same time when the driver checks whether or not an object exists on the back left or right side of the subject vehicle. Thus, the display portions 5 may be provided at positions other than the side-view mirrors. For example, the display portions 5 may be provided at positions in a vehicle interior (e.g. left and right A-pillars of the subject vehicle) near the side-view mirrors.

The controller 20 includes an electronic control unit having a microprocessor and a memory connecting the microprocessor. More specifically, the controller 20 includes a computer including a CPU, a ROM, a RAM, and other peripheral circuits such as an I/O interface. The controller 20 includes, as functional components, an approach recognition unit 21, a direction estimation unit 22 and a display control unit 23. The memory of the controller 20 stores road information in advance. The road information includes information on lanes in which the tram (FIG. 1) travels.

The approach recognition unit 21 determines whether or not an object such as another vehicle or a tram exists around the subject vehicle within a predetermined distance from the subject vehicle on the basis of a signal from the radar sensor 1. That is, the approach recognition unit recognizes an approach operation of an object approaching the subject vehicle from the diagonally back side of the subject vehicle.

The direction estimation unit 22 estimates a direction in which the subject vehicle travels on the basis of a signal from the turn signal switch 4. For example, the direction estimation unit estimates that the subject vehicle is to change lanes or turn right or left.

The display control unit 23 first determines whether or not the subject vehicle is located on the side of the center lane LN0 (FIG. 1) on which the tram 201 travels on the basis of road map information stored in the memory and a signal from the positioning sensor 3. The display control unit may determine whether or not the subject vehicle is located on the side of the center lane LN0 on the basis of an image captured by an in-vehicle camera. The display control unit may determine whether or not the subject vehicle is located on the side of the center lane LN0 when a position of the subject vehicle detected by the positioning sensor 3 is within a predetermined distance from the center lane LN0.

Figure 3:
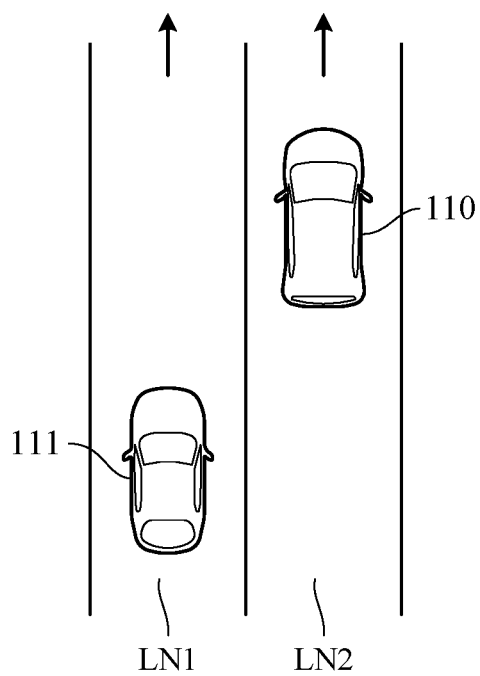
FIG. 3 is a diagram showing an example of the travel scene different from those in FIG. 1.

FIG. 3 illustrates an example of a traveling scene where there is no lane for trams on the side of a traveling lane (second lane LN2) on which the subject vehicle 110 travels, that is, where the subject vehicle is not located on the side of the center lane LN0 on which the tram 201 travels. In this case, the display control unit 23 controls the display portions 5 as follows. When a vehicle speed v of the subject vehicle 110 detected by the vehicle speed sensor 2 is equal to or larger than a predetermined value v1 and the approach recognition unit 21 recognizes an approach operation of the other vehicle 111 from the diagonally back side of the subject vehicle 110 as illustrated in FIG. 3, the display control unit 23 turns on the display portion 5 on the side (left side) on which the other vehicle 111 is detected between the left and right display portions 5. The predetermined value v1 is set to a value larger than zero (e.g. 20 km/h). Therefore, the display portions 5 are turned on when the subject vehicle 110 is traveling. Accordingly, the driver can recognize the existence of the other vehicle 111 even when the other vehicle 111 diagonally behind the subject vehicle 110 does not appear in the side-view mirrors.

Thereafter, when the direction estimation unit 22 estimates that the subject vehicle 110 moves to the side (left side) on which the other vehicle 111 is detected, the display control unit 23 causes the display portion 5 to blink. Therefore, the driver can change lanes safely, while recognizing the existence of the other vehicle 111 behind. At the same time when the display portion 5 blinks, a warning sound may be emitted from a speaker in the vehicle interior. In a case where the vehicle speed detected by the vehicle speed sensor 2 is smaller than the predetermined value v1 (e.g. while the vehicle is stopped), the display portion 5 is not turned on or does not blink even if the other vehicle 111 is detected on the diagonally back side.

Meanwhile, as illustrated in FIG. 1, when the subject vehicle 110 is located on the side of the center lane LN0 and the approach recognition unit 21 recognizes an approach operation of the tram 201 from the diagonally back side of the subject vehicle 110, the display control unit 23 controls the display portions 5 as follows. In this case, when the vehicle speed v detected by the vehicle speed sensor 2 is equal to or smaller than a predetermined value v2 (e.g. 3 km/h) and the direction estimation unit 22 estimates that the subject vehicle 110 moves to cross a railroad track 200 after the signal light turns green, the display control unit 23 turns on the display portion 5 or causes the display portion 5 to blink. Therefore, the driver who has stopped the subject vehicle to wait for the traffic light to change in front of the intersection 103 can easily recognize that the tram 201 approaches from the diagonally back side. At the same time when the display portion 5 is displayed, a warning sound may be emitted from the speaker in the vehicle interior. The predetermined value v2 may be 0 km/h.

Even when the approach recognition unit 21 recognizes the approach operation of the tram 201, the display control unit 23 does not turn on the display portion 5 or cause the display portion 5 to blink while the subject vehicle is travelling at the vehicle speed v detected by the vehicle speed sensor 2 larger than the predetermined value v2. Even when the vehicle speed v is equal to or smaller than the predetermined value v2, the display control unit 23 does not turn on the display portion 5 or cause the display portion 5 to blink in a case where the direction estimation unit 22 does not estimate that the subject vehicle 110 moves to cross the railroad track 200 (FIG. 1) (e.g. turns right), that is, in a case where the direction estimation unit estimates that the subject vehicle 110 travels straight or turns left at the intersection 103.

Figure 4:
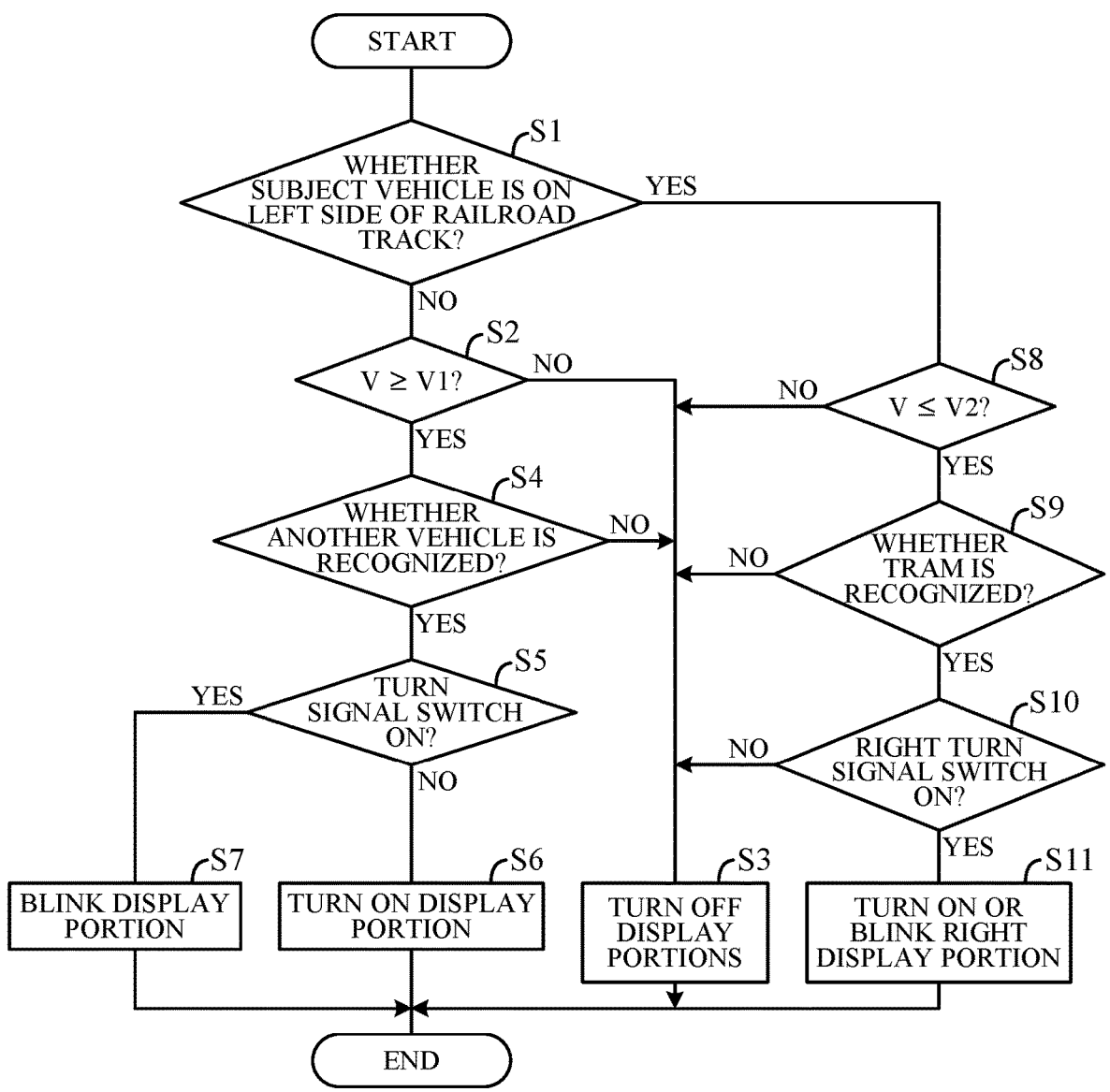
FIG. 4 is a flowchart illustrating an example of processing executed by a controller in FIG. 2.

FIG. 4 is a flowchart showing an example of processing executed by the controller 20 (microprocessor) in FIG. 2. The processing shown in the flowchart starts when, for example, a power key switch is turned on and is repeated at predetermined cycles.

First, In S1, the controller refers to the road map information stored in the memory, and determines whether or not the subject vehicle 110 is located on the side of the railroad track 200 for the road surface train based on the signal from the positioning sensor 3. If a negative decision is made in S1, the processing proceeds to S2, and the controller determines whether or not the vehicle speed v of the subject vehicle 110 detected by the vehicle speed sensor 2 is equal to or larger than the predetermined v1, that is, whether or not the subject vehicle 110 is traveling at the predetermined vehicle speed V1 or larger. If a negative decision in S2 is made, the processing proceeds to S3, and the controller outputs a control signal to the display portions 5 so as to turn off the display portions 5.

If an affirmative decision in S2 is made, the processing proceeds to S4, and the controller determines whether or not the other vehicle 111 is recognized obliquely behind the subject vehicle 110 based on a signal from the radar sensor 1. If an affirmative decision in S4 is made, the processing proceeds to S5, and if a negative decision is made, the processing proceeds to S3. In S5, the controller determines whether or not the turn signal switch 4 is turned on. If a negative decision in S5 is made, the processing proceeds to S6, and the controller makes the display portion 5 in the side-view mirror on the side on which the other vehicle 111 is recognized turn on. On the other hand, if an affirmative decision in S5 is made, the processing proceeds to S7, and the controller makes the display portion 5 in the side-view mirror on the side on which the other vehicle 111 is recognized blink. The warning sound may be output simultaneously with the blinking of the display portion 5.

If the controller determines in S1 that the subject vehicle 110 is located on the side of the railroad track 200 for the tram, the processing proceeds to S8. In S8, the controller determines whether or not the vehicle speed v of the subject vehicle 110 detected by the vehicle speed sensor 2 is equal to or smaller than the predetermined v2, that is, whether or not the subject vehicle 110 is stopped. If an affirmative decision in S8 is made, the processing proceeds to S9, and if a negative decision is made, the processing proceeds to S3. In S9, the controller determines whether or not the tram 201 is recognized diagonally behind the subject vehicle 110 (on the railroad track side) on the basis of a signal from the radar sensor 1. If an affirmative decision in S9 is made, the processing proceeds to S10, and if a negative decision is made, the processing proceeds to S3.

In S10, the controller determines whether or not the turn signal switch 4 on the right side, that is, on the railroad track side is turned on. If an affirmative decision in S10 is made, the processing proceeds to S11, and if a negative decision is made, the processing proceeds to S3. In S11, the controller makes the display portion 5 in the side-view mirror on the right side turn on. The display portion 5 on the right side may be made to blink. The warning sound may be output at the same time as the display portion 5 is turned on or blinks.

An operation of the driving assistance apparatus 100 according to the present embodiment is summarized as follows. When the other vehicle 111 approaches from the diagonally back left side of the subject vehicle 110 while the subject vehicle 110 is traveling on a normal road on the side of which the railroad track 200 for the tram 201 is not located as illustrated in FIG. 3, the display portion 5 of the left side-view mirror is turned on (S6). Thereafter, when the left turn signal switch 4 is turned on and the subject vehicle 110 attempts to change the second lane LN2 to the first lane LN1, the display portion 5 blinks (S7). Therefore, even in a case where the other vehicle 111 does not appear in the side-view mirror when the driver changes lanes, the driver can recognize the existence of the other vehicle 111 and can change lanes safely.

When the subject vehicle 110 crosses the railroad track 200 for the tram 201, the subject vehicle 110 stops on the side of the railroad track 200 while the turn signal lamp for turning right is on as illustrated in FIG. 1. At this time, when the tram 201 approaches from the diagonally back right side of the subject vehicle 110, the display portion 5 of the right side-view mirror is turned on or blinks (S11). Therefore, the driver who has stopped the subject vehicle to wait for the traffic light to change can recognize that the tram 201 approaches from behind. Accordingly, the driver expects the passage of the tram 201, and thus is less surprised in a case where the tram 201 passes by the subject vehicle 110. This makes the driver more comfortable.

The display portion 5 originally notifies the driver of the approach of the other vehicle 111 during traveling, and the driver is accustomed to visually recognizing the display portion 5. Therefore, the driver can easily recognize the approach of the tram 201 by turning on or blinking of the display portion 5. The display portion 5 for notifying the driver of the approach of the traveling another vehicle 111 is used to notify the driver of the approach of the tram 201. Thus, it is unnecessary to separately provide a notification part, thereby suppressing an increase in cost. Facilities such as a communication beacon are unnecessary. Also in this respect, the increase in cost can be suppressed.

According to the present embodiment, the following operations and effects are achievable.

(1) A driving assistance apparatus 100 is configured to assist a driver in driving a subject vehicle 110 located on the side of a railroad track 200 on which a tram 201 serving as a railway vehicle travels. The driving assistance apparatus 100 includes: an approach recognition unit 21 that recognizes approach of the tram 201 along the railroad track 200 to the subject vehicle 110 from the diagonally back side of the subject vehicle 110 on the basis of a signal from a radar sensor 1, without using road-to-vehicle communication; a direction estimation unit 22 that estimates a traveling direction of the subject vehicle 110 at an intersection 103; and a display control unit 23 (a notification control unit) that controls a display portion 5 so as to notify the driver of the approach of the tram 201 when the direction estimation unit 22 estimates that the subject vehicle travels to cross the railroad track 200 and the approach recognition unit 21 detects (recognizes) the approach of the tram 201 to the subject vehicle 110 (FIG. 2).

With this configuration, it is possible to notify the driver of the subject vehicle 110 that stops for crossing the railroad track 200, that is, the driver who is waiting for the tram 201 to pass, of the approach of the tram 201 with an inexpensive configuration, without performing road-to-vehicle communication using a communication beacon.

(2) When another vehicle 111 travels along a lane LN1 adjacent to a lane LN2 while the subject vehicle 110 is traveling in the lane LN2, the approach recognition unit 21 further recognizes approach of the other vehicle 111 to the subject vehicle 110 from the diagonally back side of the subject vehicle 110 (FIGS. 3 and 4). When the approach recognition unit 21 detects the approach of the other vehicle 111 to the subject vehicle 110 while the subject vehicle 110 is traveling, the display control unit 23 controls the display portion 5 to further notify the driver of the approach of the other vehicle 111 (FIG. 4). Therefore, the display portion 5 for notifying the driver of the approach of the other vehicle 111 from the diagonally back side can be used to notify the driver of the approach of the tram 201. Therefore, it is unnecessary to separately provide a device for notifying the driver of the approach of the tram 201, which can reduce a cost.

(3) When the approach recognition unit 21 recognizes the approach of the other vehicle 111 while the subject vehicle 110 is stopped, the display control unit 23 controls the display portion 5 so as not to notify the driver of the approach of the other vehicle 111, whereas, when the approach recognition unit 21 detects the approach of the tram 201 while the subject vehicle 110 is stopped, the display control unit 23 controls the display portion 5 so as to notify the driver of the approach of the tram 201 (FIG. 4). The subject vehicle 110 does not change lanes while stopped, and thus it is unnecessary to notify the driver of the approach of the other vehicle 111. Meanwhile, the driver is surprised when the tram 201 passes by the subject vehicle 110 unexpectedly for the driver. Therefore, it is preferable to notify the driver of the approach of the tram 201 even while the subject vehicle 110 is stopped. The driving assistance apparatus 100 is configured in consideration of this point in the present embodiment, which makes the driver more comfortable.

(4) The driving assistance apparatus 100 includes the radar sensor 1 that is provided at the back of the subject vehicle 110 to detect a position of an object located on the diagonally back side of the subject vehicle 110. The approach recognition unit 21 detects the approach of the tram 201 on the basis of a signal from the radar sensor 1 (FIG. 2). Using the radar sensor 1 in this manner makes it possible to detect the approach of the tram 201 inexpensively.

Figure 5:
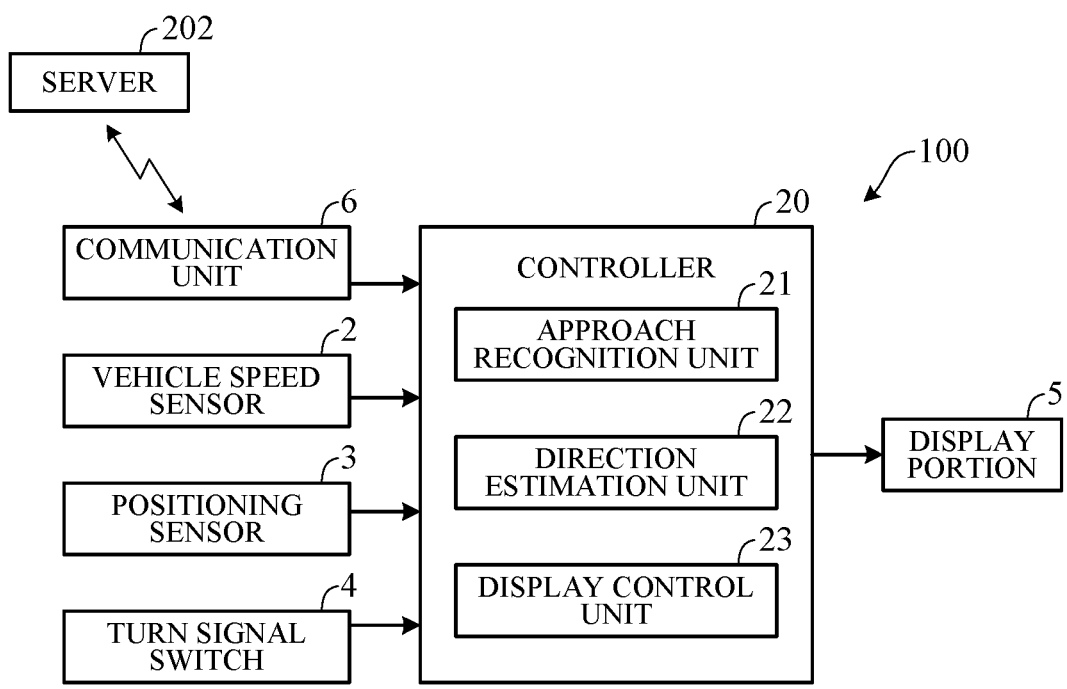
FIG. 5 is a block-diagram showing a modification of FIG. 2.

In the above embodiment, the approach of the tram 201 (a railway vehicle) to the subject vehicle 110 along the railroad track 200 (a travel path) is detected using the radar sensor 1, but the configuration of an approach detection unit is not limited to this. FIG. 5 is a diagram illustrating a modification of FIG. 2. In FIG. 5, a communication unit 6 is provided in place of the radar sensor 1. The communication unit 6 is connected to a communication network such as a wireless communication network, an Internet network, or a telephone line network, and is configured to be capable of performing wireless communication with an external server device 202 via the communication network.

The server device 202 is a management server that manages an operation of the tram 201. The controller 20 acquires, from the server device 202 via the communication unit 6, operation information of the tram 201 corresponding to the position of the subject vehicle 110 obtained by the positioning sensor 3. The approach recognition unit 21 recognizes the approach of the tram 201 to the subject vehicle 110 based on the operation information of the tram 201. Accordingly, it is not necessary to use the radar sensor 1 to detect the approach of the tram 201, and the entire apparatus can be configured at a lower cost.

Figure 6:
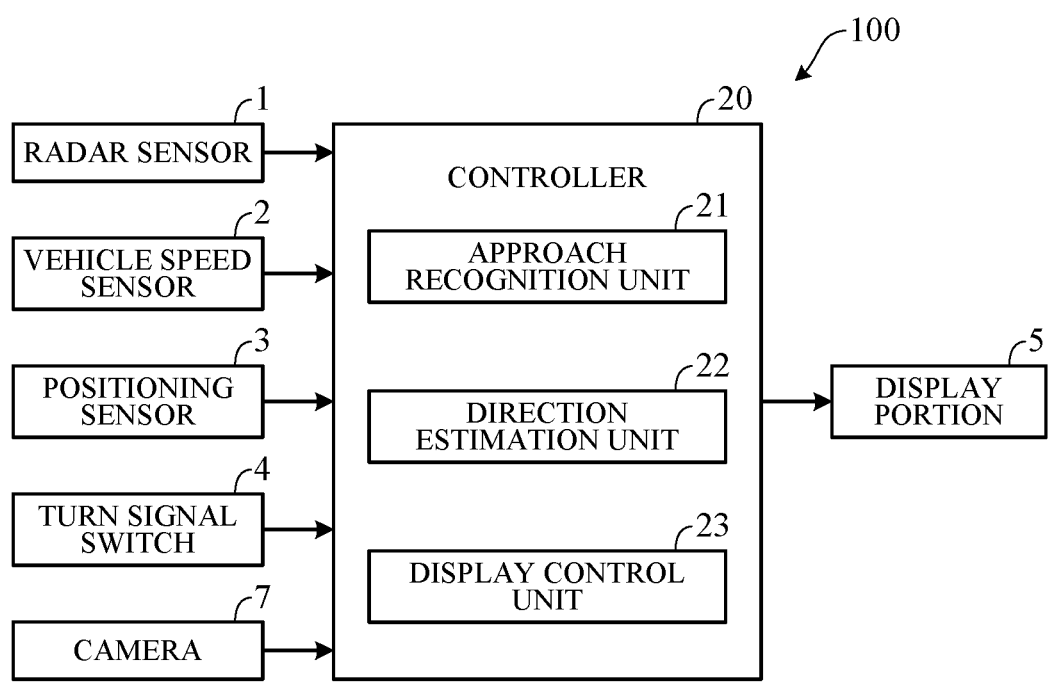
FIG. 6 is a block-diagram showing another modification of FIG. 2.

The driving assistance apparatus 100 may include a situation recognition part that detects a situation around the subject vehicle 110. In this case, when the situation recognition unit recognizes a traffic light 123 for railway vehicles ahead of the subject vehicle 110, the direction estimation unit 22 may estimate a traveling direction of the subject vehicle 110. FIG. 6 is a block diagram illustrating a configuration of main parts of the driving assistance apparatus 100 in that case. As illustrated in FIG. 6, the situation recognition part can include, for example, a camera 7 provided in the subject vehicle 110 to capture an image of the front of the subject vehicle 110. The traffic light 123 for trams looks different from the traffic lights 121 and 122 for vehicles, and thus the traffic light 123 can be easily identified on the basis of the camera image. The direction estimation unit 22 is configured to estimate the traveling direction of the subject vehicle 110 when the traffic light 123 is recognized. This makes it possible to reduce a processing load in the controller 20.

The above embodiment can be modified in various forms. Several modifications will be described below. In the above embodiment, the tram 201 travels at the center in the width direction of the road 101 (center lane LN0), but may travel at a location other than the center of the road. In the above embodiment, the approach recognition unit 21 recognizes the approach of the tram 201 based on the signal from the radar sensor 1, thereby detecting the approach of the tram 201, or the controller 20 acquires the operation information of the tram 201 via the communication unit 6 serving as an information acquisition unit, and the approach recognition unit 21 recognizes the approach of the tram 201 based on the operation information, thereby detecting the approach of the tram 201, but the configuration of an approach detection part is not limited to the above configuration.

In the above embodiment, the direction estimation unit 22 estimates the traveling direction of the subject vehicle 110 at the intersection 103 based on the signal from the turn signal switch 4, but for example, the traveling direction may be estimated based on a route information to a destination set by a navigation device, and the configuration of a direction estimation unit is not limited to the above configuration. In the above embodiment, the driver is notified of the approach of the tram 201 provided that the vehicle speed v of the subject vehicle 110 is equal to or smaller than the predetermined value v2 (for example, 0), but the predetermined value v2 may be larger than 0.

In the above embodiment, the driver is notified of the approach of the tram 201 by turning on or blinking the display portions 5 of the side-view mirrors (a pair of left and right display portions) that is a kind of side mirrors provided on the left and right sides of the subject vehicle. However, the configuration of a notification part is not limited to this. In addition to the notification part for notifying of detection of the approach of the other vehicle, a notification part for notifying of detection of the approach of the tram may be provided. In the above embodiment, the position of the subject vehicle 110 is detected by the signal from the positioning sensor 3. However, the configuration of a position detection part is not limited to this. In the above embodiment (FIG. 3), the configuration of the driving assistance apparatus 100 is described by way of example in which the other vehicle 111 travels in the lane LN1 (a second lane) on the left side in the lane LN2 while the subject vehicle 110 travels in the right lane LN2 (a first lane). However, the first lane may be on the left side of the second lane.

The present invention can also be used as a driving assistance method configured to assist a driving by a driver of a subject vehicle, the subject vehicle locating on a side of a travel path on which a railway vehicle travels, the driving assistance method including detecting an approach of the railway vehicle along the travel path from a diagonally backward of the subject vehicle to the subject vehicle without using a road-to-vehicle communication, estimating a traveling direction of the subject vehicle at an intersection, and notifying the driver of the approach of the railway vehicle when the traveling direction crossing the travel path is estimated and the approach of the railway vehicle to the subject vehicle is detected.

The above embodiment can be combined as desired with one or more of the above modifications. The modifications can also be combined with one another.

According to the present invention, it is possible to provide a driver of a vehicle crossing a travel path of a railway vehicle with a useful information in a low-cost configuration.

Above, while the present invention has been described with reference to the preferred embodiments thereof, it will be understood, by those skilled in the art, that various changes and modifications may be made thereto without departing from the scope of the appended claims.

What is claimed is:

1. A driving assistance apparatus, configured to assist a driving by a driver of a subject vehicle, the subject vehicle being on a side of a travel path on which a railway vehicle travels,
  the driving assistance apparatus comprising:
  an approach detection part detecting an approach of the railway vehicle along the travel path from a diagonally backward of the subject vehicle to the subject vehicle without using a road-to-vehicle communication;
  a notification part notifying the driver of information; and
  an electronic control unit including a microprocessor and a memory connected to the microprocessor, wherein
  the microprocessor is configured to perform:
  estimating a traveling direction of the subject vehicle at an intersection; and
  controlling the notification part so as to notify the driver of the approach of the railway vehicle when the traveling direction crossing the travel path is estimated and the approach of the railway vehicle to the subject vehicle is detected by the approach detection part.

2. The driving assistance apparatus according to claim 1, wherein
  the approach detection part further detects an approach of another vehicle from the diagonally backward of the subject vehicle to the subject vehicle when the other vehicle travels along a second lane adjacent to a first lane during traveling of the subject vehicle in the first lane, and
  the microprocessor is configured to perform
  the controlling including controlling the notification part so as to further notify the driver of the approach of the other vehicle when the approach of the other vehicle to the subject vehicle is detected by the approach detection part during traveling of the subject vehicle.

3. The driving assistance apparatus according to claim 2, wherein
  the microprocessor is configured to perform
  the controlling including controlling the notification part so as to notify the approach of the railway vehicle when the approach of the railway vehicle is detected by the approach detection part during stopping of the subject vehicle, while so as not to notify the approach of the other vehicle when the approach of the other vehicle is detected by the approach detection part during stopping of the subject vehicle.

4. The driving assistance apparatus according to claim 1, wherein
  the approach detection part includes a radar sensor provided at a back portion of the subject vehicle to detect a position of an object in a diagonally backward of the subject vehicle.

5. The driving assistance apparatus according to claim 1, further comprising
  a position detection part detecting a position of the subject vehicle, wherein
  the microprocessor is configured to further perform
  acquiring operation information of the railway vehicle corresponding to the position of the subject vehicle detected by the position detection part, and
  the approach detection part detects the approach of the railway vehicle based on the operation information.

6. The driving assistance apparatus according to claim 1, further comprising a situation recognition part recognizing a situation around the subject vehicle, wherein the microprocessor is configured to perform the estimating including estimating the traveling direction of the subject vehicle when a traffic light for the railway vehicle is recognized by the situation recognition part.

7. The driving assistance apparatus according to claim 1, further comprising a turn signal switch detecting an operation of a direction indicator, wherein the microprocessor is configured to perform the estimating including estimating the traveling direction of the subject vehicle based on a signal from the turn signal switch.

8. The driving assistance apparatus according to claim 1, wherein the notification part includes a pair of left and right display portions provided at side-mirrors disposed on left and right sides of the subject vehicle or near the side-mirrors, and the microprocessor is configured to perform the controlling including controlling the pair of left and right display portions so that when the traveling direction crossing the travel path is estimated during stopping of the subject vehicle and the approach of the railway vehicle to the subject vehicle is detected by the approach detection part, one of the pair of left and right display portions disposed at a side on which the railway vehicle is detected is turned on or blinks.

9. A driving assistance apparatus, configured to assist a driving by a driver of a subject vehicle, the subject vehicle being on a side of a travel path on which a railway vehicle travels, the driving assistance apparatus comprising:

an approach detection part detecting an approach of the railway vehicle along the travel path from a diagonally backward of the subject vehicle to the subject vehicle without using a road-to-vehicle communication;

a notification part notifying the driver of information; and an electronic control unit including a microprocessor and a memory connected to the microprocessor, wherein the microprocessor is configured to function as:

a direction estimation unit that estimates a traveling direction of the subject vehicle at an intersection; and a notification control unit that controls the notification part so as to notify the driver of the approach of the railway vehicle when the traveling direction crossing the travel path is estimated by the direction estimation unit and the approach of the railway vehicle to the subject vehicle is detected by the approach detection part.

10. The driving assistance apparatus according to claim 9, wherein the approach detection part further detects an approach of another vehicle from the diagonally backward of the subject vehicle to the subject vehicle when the other vehicle travels along a second lane adjacent to a first lane during traveling of the subject vehicle in the first lane, and the notification control unit controls the notification part so as to further notify the driver of the approach of the other vehicle when the approach of the other vehicle to the subject vehicle is detected by the approach detection part during traveling of the subject vehicle.

11. The driving assistance apparatus according to claim 10, wherein the notification control unit controls the notification part so as to notify the approach of the railway vehicle when the approach of the railway vehicle is detected by the approach detection part during stopping of the subject vehicle, while so as not to notify the approach of the other vehicle when the approach of the other vehicle is detected by the approach detection part during stopping of the subject vehicle.

12. The driving assistance apparatus according to claim 9, wherein the approach detection part includes a radar sensor provided at a back portion of the subject vehicle to detect a position of an object in a diagonally backward of the subject vehicle.

13. The driving assistance apparatus according to claim 9, further comprising a position detection part detecting a position of the subject vehicle, wherein the microprocessor is configured to further function as an information acquisition unit that acquires operation information of the railway vehicle corresponding to the position of the subject vehicle detected by the position detection part, and the approach detection part detects the approach of the railway vehicle based on the operation information acquired by the information acquisition unit.

14. The driving assistance apparatus according to claim 9, further comprising a situation recognition part recognizing a situation around the subject vehicle, wherein the direction estimation unit estimates the traveling direction of the subject vehicle when a traffic light for the railway vehicle is recognized by the situation recognition part.

15. The driving assistance apparatus according to claim 9, further comprising a turn signal switch detecting an operation of a direction indicator, wherein the direction estimation unit estimates the traveling direction of the subject vehicle based on a signal from the turn signal switch.

16. The driving assistance apparatus according to claim 9, wherein the notification part includes a pair of left and right display portions provided at side-mirrors disposed on left and right sides of the subject vehicle or near the side-mirrors, and the notification control unit controls the pair of left and right display portions so that when the traveling direction crossing the travel path is estimated by the direction estimation unit during stopping of the subject vehicle and the approach of the railway vehicle to the subject vehicle is detected by the approach detection part, one of the pair of left and right display portions disposed at a side on which the railway vehicle is detected is turned on or blinks.

17. A driving assistance method, configured to assist a driving by a driver of a subject vehicle, the subject vehicle being on a side of a travel path on which a railway vehicle travels, the driving assistance method comprising:

detecting an approach of the railway vehicle along the travel path from a diagonally backward of the subject vehicle to the subject vehicle without using a road-to-vehicle communication;

estimating a traveling direction of the subject vehicle at an intersection; and notifying the driver of the approach of the railway vehicle when the traveling direction crossing the travel path is estimated and the approach of the railway vehicle to the subject vehicle is detected.

\* \* \* \* \*